United States Patent
Mitsumoto et al.

(10) Patent No.: US 6,173,570 B1
(45) Date of Patent: Jan. 16, 2001

(54) EXHAUST GAS PURIFICATION DEVICE FOR INTERNAL COMBUSTION ENGINE

(75) Inventors: Hisashi Mitsumoto, Kanagawa; Kouji Ishihara, Yokohama, both of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/404,177

(22) Filed: Sep. 27, 1999

(30) Foreign Application Priority Data

Oct. 6, 1998 (JP) ................................. 10-283932

(51) Int. Cl.⁷ ........................................ F01N 3/00
(52) U.S. Cl. ................. 60/285; 60/286; 60/295; 60/301
(58) Field of Search ............... 60/274, 276, 285, 60/286, 295, 301; 123/295, 305, 520

(56) References Cited

U.S. PATENT DOCUMENTS

| | | |
|---|---|---|
| 5,423,181 | 6/1995 | Katoh et al. . |
| 5,775,099 | 7/1998 | Ito et al. . |
| 5,910,096 * | 6/1999 | Hepburn et al. ................... 60/286 |
| 5,954,023 * | 9/1999 | Mizuno et al. ..................... 123/295 |
| 6,003,306 * | 12/1999 | Kalversberg et al. ............... 60/276 |
| 6,032,637 * | 3/2000 | Mamiya et al. ..................... 123/295 |
| 6,044,642 * | 4/2000 | Nishimura et al. ................. 60/285 |
| 6,058,701 * | 5/2000 | Mashiki ............................... 60/285 |
| 6,073,606 * | 6/2000 | Shimizu et al. ..................... 123/295 |

FOREIGN PATENT DOCUMENTS

| | | |
|---|---|---|
| 7-332071 | 12/1995 | (JP) . |
| 2692530 | 9/1997 | (JP) . |

* cited by examiner

*Primary Examiner*—Thomas Denion
*Assistant Examiner*—Tu M. Nguyen
(74) *Attorney, Agent, or Firm*—Foley & Lardner

(57) ABSTRACT

In a device for purifying an exhaust gas mixture from an engine, a catalyst traps and reduces NOx in dependence of the air fuel ratio of the exhaust gas mixture from the engine. A controller detects a predetermined condition to initiate a catalyst regenerating control to reduce NOx in the catalyst, and controls the engine in a catalyst regeneration control mode when the predetermined condition is detected. In the catalyst regeneration control mode, the controller sets the fuel injection timing on the compression stroke and the fuel injection quantity at a level to make the average air fuel ratio in a combustion chamber equal to or leaner than the stoichiometric ratio and to produce a rich air fuel mixture region richer than the stoichiometric ratio in the vicinity of a spark plug.

14 Claims, 6 Drawing Sheets

FIG.4
(RETARDED IGNITION TIMING)

FIG.5
(ADVANCED IGNITION TIMING)

FIG.6
(INTERMEDIATE IGNITION TIMING)

EXHAUST GAS PURIFICATION DEVICE FOR INTERNAL COMBUSTION ENGINE

BACKGROUND OF THE INVENTION

The present invention relates to exhaust gas purifying device or apparatus and process for an internal combustion engine equipped with an NOx trap catalyst.

Japanese Patent No.2692530 shows a control system for regenerating an NOx absorbing type catalyst by enriching an air fuel mixture temporarily and thereby releasing NOx from the catalyst in a reducing atmosphere. Japanese Patent Provisional Publication No. H7(1995)-332071shows a control system for controlling a direct injection gasoline engine to regenerate an NOx absorbing catalyst.

SUMMARY OF THE INVENTION

Enrichment of the air fuel mixture to desorb NOx from a catalyst can deteriorate the fuel consumption. In the case of a direct injection gasoline engine, enrichment in a compression stroke fuel injection tends to increase the possibility of misfire, and hence the enrichment can be achieved by changing the fuel injection timing to an intake stroke. In either case, the enrichment to release NOx constitutes a factor deteriorating the fuel economy and causing unwanted torque increase incurring the need for measures, such as retardation of the ignition timing, to prevent torque shock or torque fluctuation.

It is, therefore, an object of the present invention to provide apparatus and/or method for regenerating an NOx trap catalyst without deteriorating fuel consumption.

According to the present invention, an exhaust gas purification device for an engine, comprises at least a catalyst trapping and purifying NOx, an injector, a spark plug and a controller.

The controller is programmed:

to detect a catalyst regeneration condition for regenerating the catalyst by reducing NOx stored in the catalyst;

to calculate a first fuel injection quantity from fulfillment of the catalyst regeneration condition to the expiration of ;a first time period, the first fuel injection quantity being equal to or smaller than a stoichiometric fuel quantity required to set an average air fuel ratio in the combustion chamber equal to a stoichiometric air fuel ratio;

to calculate a first fuel injection timing based on the first fuel injection quantity, the first fuel injection timing being such a timing of fuel injection in the first fuel injection quantity on a compression stroke as to produce an air fuel mixture having a rich air fuel ratio in a limited region around the spark plug; and to control the injector according to the first fuel injection quantity and the first fuel injection timing from the fulfillment of the catalyst regeneration condition to the expiration of the first time period.

According to another aspect of the present invention, an engine system comprises a direct injection internal combustion engine, a catalyst, an engine operating condition sensor; and a controller for controlling a fuel injection quantity and a fuel injection timing of the engine in a stratified charge combustion mode in a predetermined engine operating region, for monitoring the engine operating condition to detect a predetermined catalyst regeneration condition, and for changing an engine control mode, upon detection of the catalyst regeneration condition, from the stratified charge combustion mode to the catalyst regeneration combustion mode by increasing the fuel injection quantity from an ultra lean level to achieve an ultra lean target air fuel ratio for the stratified charge combustion mode to a non-rich level to achieve a non-rich target air fuel ratio equal to or leaner than a stoichiometric: air fuel ratio, and by holding the fuel injection timing on a compression stroke.

An engine controlling device according to the present invention may comprise:

means for calculating a first fuel injection quantity equal to or smaller than a stoichiometric fuel quantity required to set an average air fuel ratio in the combustion chamber equal to a stoichiometric air fuel ratio;

means for calculating a first fuel injection timing on a compression stroke so as to produce a limited region having an air fuel ratio richer than the stoichiometric air fuel ratio around the spark plug by fuel injection in the first injection quantity; and means for controlling the engine according to the first fuel injection quantity and the first fuel injection timing from detection of a predetermined catalyst regeneration condition to the expiration of a predetermined time period.

An engine controlling process according to the present invention comprises:

calculating a first fuel injection quantity equal to or smaller than a stoichiometric fuel quantity required to set an average air fuel ratio in the combustion chamber equal to a stoichiometric air fuel ratio;

calculating a first fuel injection timing on a compression stroke so as to produce an air fuel mixture having a rich air fuel ratio richer than the stoichiometric air fuel ratio in a limited region around the spark plug by the fuel injection in the first injection quantity; and controlling the engine according to the first fuel injection quantity and the first fuel injection timing from detection of a predetermined catalyst regeneration condition to the expiration of a predetermined time period.

DETAILED DESCRIPTION OF THE INVENTION

Figure 1:
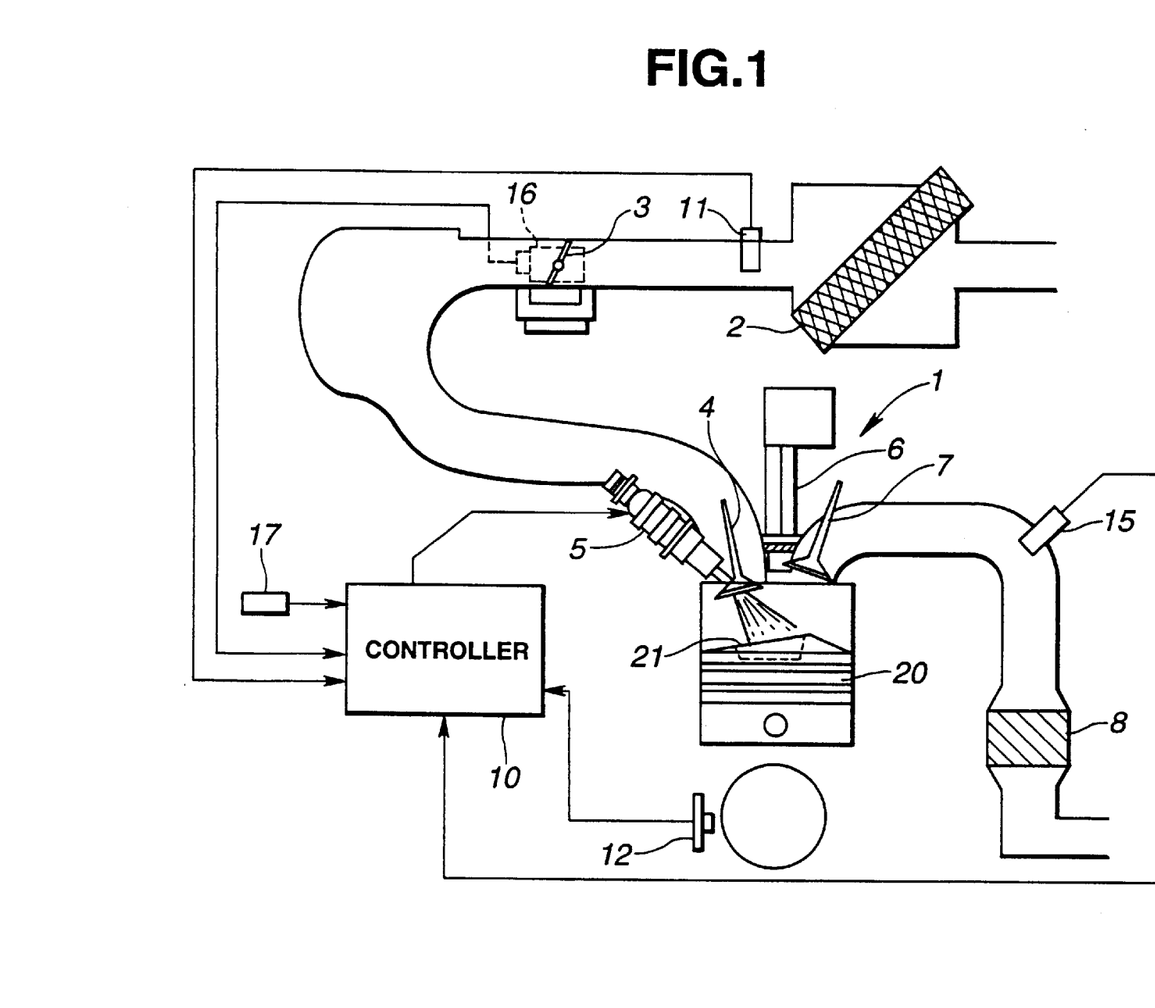
FIG. 1 is a schematic view showing an engine system according to one embodiment of the present invention.

FIG. 1 shows an engine system equipped with an exhaust gas purification device or apparatus according to one embodiment of the present invention.

An engine 1 of this example is a prime mover of a vehicle. Intake air filtered through an air cleaner 2 is drawn into each cylinder of the engine 1 through a throttle valve 3 for controlling the intake air flow, and an intake valve 4. A fuel injector 5 of an electromagnetic type is provided for each cylinder to inject fuel directly into the combustion chamber and thereby produce a layer of an air fuel mixture in the cylinder.

Fuel injection on an intake stroke produces a layer of a homogenous air fuel mixture by allowing sufficient time for mixing from injection to ignition. On the other hand, stratified charge layer is formed around a spark plug 6 by injection of fuel on the latter stage of a compression stroke toward a cavity 21 formed in the crown of a piston 20. In this case, there is no time for fuel to diffuse sufficiently, so that a rich mixture region is formed in the vicinity of the spark plug, surrounded by a lean layer.

The air fuel mixture is ignited by the spark plug 6, and combustion takes place. Burned gases are expelled from the cylinder through an exhaust valve 7, and purified through a catalyst 8. Then, the exhaust gases are emitted to the atmosphere.

A controller 10 of this example includes a microcomputer as a main component. The controller 10 controls the fuel injection of each injector 5 and the ignition of each spark plug 6. With the controller 10, the engine system is in the form of a control system.

Various sensor and input devices collect input information on engine operating conditions. The controller 10 receives the input information by receiving signals from these devices. In the example of FIG. 1, there are air flow meter or sensor 11 for sensing an intake air quantity, crank angle sensor 12 for sensing an engine rotational angle and an engine revolution speed, oxygen sensor 15 for sensing an air fuel ratio by responding to an oxygen concentration in the exhaust gas mixture, throttle sensor 16 for sensing an opening degree of the throttle valve 3, and temperature sensor 17 for sensing the temperature of a cooling water of the engine 1.

During operation at a stoichiometric air fuel ratio, the catalyst 8 functions to oxidize HC and CO and to reduce NOx. During operation at lean air fuel ratios, the catalyst 8 traps and stores NOx. The stored NOx is reduced in the reducing atmosphere of stoichiometric or richer air fuel ratios containing HC and CO sufficiently.

The controller 10 discriminates between a lean air fuel ratio engine operating region, such as a part load region, for operating at an ultra lean air fuel ratio (A/F=40, for example), and a stoichiometric air fuel ratio engine operating region, such as a high load region, for operating at a stoichiometric air fuel ratio (A/F=14.5). In the lean air fuel ratio operating region, the controller 10 sets the fuel injection timing at the latter stage of the compression stroke to achieve a stratified charge combustion. In the stoichiometric: air fuel operating region, the controller 10 sets the fuel injection timing on the intake stroke to achieve a homogeneous charge combustion.

At each changeover from the lean air fuel ratio operating region to the stoichiometric air fuel ratio operating region, the controller 10 of this example produces a reducing exhaust gas atmosphere abundant in HC and CO for a predetermined period in order to regenerate the catalyst 8, that is to reduce the stored NOx before the quantity of NOx trapped during the lean operation reaches a saturation quantity.

To avoid deterioration in the fuel consumption during this catalyst regenerating control, the control system according to the present invention is arranged to inject fuel in the latter half of the compression stroke in such an amount at such a timing as to make the average air fuel ratio in a combustion chamber equal to or leaner than the stoichiometric: air fuel ratio and to produce a rich air fuel mixture region closely around the spark plug 6 richer than the stoichiometric ratio. By so doing, the control system increases unburned components to increase HC and CO contents in the exhaust gas mixture.

Figure 2:
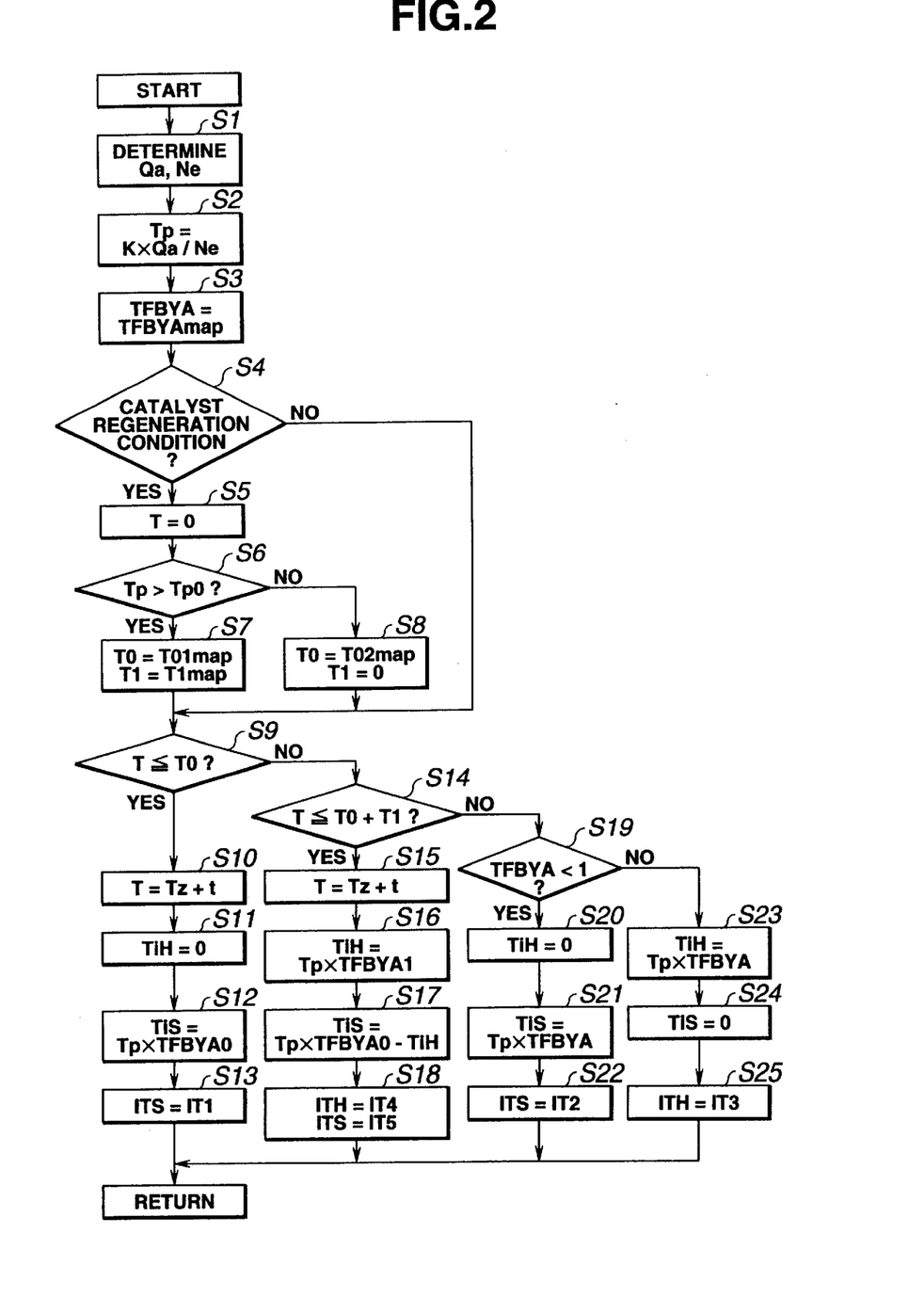
FIG. 2 is a flow chart showing a control process performed by a controller shown in FIG. 1.

A control routine of FIG. 2 is performed at regular time intervals of a predetermined time length (or cycle time) t (10 ms, for example). In this control routine, the controller 10 calculates a fuel injection quantity TiH and a fuel injection timing ITH for a fuel injection on an intake stroke, and a fuel injection quantity TiS and a fuel injection timing ITS for a fuel injection on a compression stroke. The calculated TiH, TiS, ITH and ITS are stored in a memory. In a fuel injection execution routine (not shown) performed in synchronism with the engine revolution, the controller 10 reads these fuel injection quantities and timings from the memory and uses for carrying out the fuel injection.

At a step S1, the controller 10 determines the intake air quantity Qa by A/D conversion of the output of the air flowmeter 11, and further determines the engine revolution speed Ne (rpm) in accordance with the pulse spacing of a pulse signal produced by the crank angle sensor 12.

At a step S2, the controller 10 calculates a base fuel injection quantity Tp from the intake air quantity Qa, the engine speed Ne and a coefficient K (Tp=K×Qa/Ne). The base fuel injection quantity Tp is a fuel injection quantity required to set the average air fuel ratio in the combustion chamber equal to the stoichiometric air fuel ratio. In this example, the fuel injection quantity is calculated in terms of an opening time of the fuel injector 5. When the controller 10 delivers an injection control signal representing the base fuel injection quantity Tp [ms] to the injector 5, then the injector 5 injects the fuel in the fuel quantity corresponding to the stoichiometric air fuel ratio into the cylinder. The base fuel injection quantity Tp is further used as a parameter representing an engine load.

Figure 3:
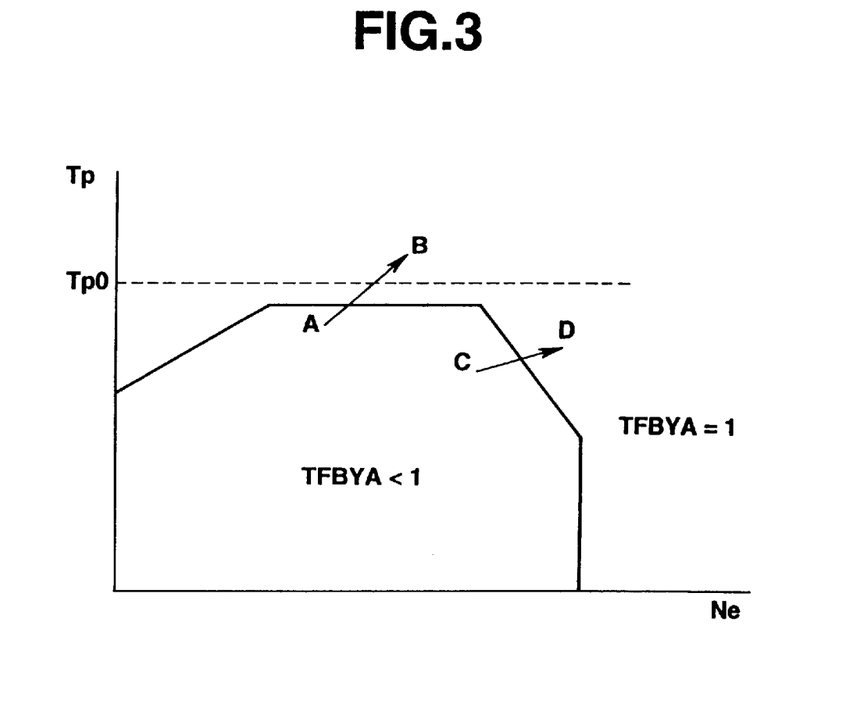
FIG. 3 is a graph showing a lean air fuel ratio engine operating region and a stoichiometric air fuel ratio engine operation region used in the engine system of FIG. 1.

At a step S3, the controller 10 looks up a map value TFBYAmap corresponding to the engine load Tp and the engine speed Ne from a target equivalent ratio setting map as shown in FIG. 3, and saves the map value TFBYAmap as a target equivalent ratio TFBYA. The target equivalent ratio TFBYA is a ratio defined, from a value of 14.5 corresponding to the stoichiometric air fuel ratio and a target value A/F0 of the average air fuel ratio in the combustion chamber, by the following equation.

$$TFBYA=14.5/(A/F0)$$

In this example, the average air fuel ratio in the combustion chamber is controlled at a lean air fuel ratio level when the engine operating point is within a part load engine operating region (bounded by a solid line in FIG. 3)(also referred to as lean air fuel ratio operating region). Therefore, values smaller than one are stored in the part load region of the equivalent ratio setting map. For example, a map value of about 0.36 is stored in a subregion to set the target lean air fuel ratio equal to 40. An air fuel mixture having an air fuel ratio of 40 is too lean to ignite and burn. This engine system achieves satisfactory combustion of such a lean mixture having an air fuel ratio of 40 on average over the combustion chamber, by the stratified charge combustion, in which an air fuel mixture of about the stoichiometric ratio is produced closely around the spark plug with a surrounding air layer containing little fuel.

The target equivalent ratio setting map stores a value of one in a region outside the part load region. Outside the part load region, therefore, the average air fuel ratio is controlled at the stoichiometric air fuel ratio. The region outside the part load region is referred to as a stoichiometric: air fuel ratio operating region.

At a step S4, the controller 10 determines whether a catalyst regeneration condition for regenerating the catalyst 8 is satisfied or not. In this example, the controller 10 judges the catalyst regeneration condition to be satisfied when the engine operating point is shifted from the lean air fuel ratio operating region to the stoichiometric air fuel ratio operating region. In this example, the answer of the step S4 becomes YES when the previous map selected value TFBYAmap obtained at the step S3 in the previous cycle of this control routine is smaller than 1, and the current map selected value TFBYAmap obtained at the step S3 in the current cycle is one.

When the answer of the step S4 is affirmative, then the controller 10 proceeds to a step S5. At the step S5, the controller 10 resets, to zero, a timer for measuring an elapsed time from the fulfillment of the catalyst regeneration condition.

At a step S6 following the step S5, the controller 10 determines whether the engine load Tp at the transition from the lean engine operating region to the stoichiometric engine operating region is greater than a predetermined engine load value Tp0.

When the engine operating point determined by the engine load Tp and the engine speed Ne shifts from a point A located in the lean air fuel ratio operating region to a point B which is located above the level of Tp0 in the stoichiometric air fuel ratio operating region, as shown in FIG. 3, two different transitional combustion modes for Regenerating the catalyst 8 are interposed between the normal lean air fuel ratio combustion mode and the normal stoichiometric ratio combustion mode, to change the output torque in the form of three steps.

When the engine load Tp at the time of transition from the lean ratio operating region to the stoichiometric ratio region is lower than or equal to the predetermined value Tp0 (from a point C to a point D shown in FIG. 3), one transitional combustion mode for Regenerating the catalyst 8 is interposed between the normal lean air fuel ratio combustion mode and the normal stoichiometric ratio combustion mode, to change the output torque in the form of two steps.

When Tp>Tp0, then the controller 10 proceeds from the step S6 to a step S7, and sets a first time duration (or period) T0 of a first transitional combustion mode for producing CO only by a compression stroke fuel injection and a second time duration (or period) T1 of a second transitional combustion mode for producing CO by dual injection of an intake stroke injection and a compression stroke injection. Assuming that the concentration of the reducing agent CO is constant in the exhaust gas mixture, the quantity of CO supplied to the catalyst 8 per unit time increases as the flow rate of the exhaust gas mixture increases. Therefore, each of T0 and T1 is decreased as each of the engine load Tp and the engine speed Ne becomes higher. In this example, the controller 10 determines a map value T01map corresponding to values of the engine load Tp and the engine speed Ne by lookup from a map storing values of the time duration T0 for the compression stroke injection mode in relation to Tp and Ne, and a map value T1map corresponding to values of the engine load Tp and the engine speed Ne by lookup from a map storing values of the time duration T1 for the dual injection mode in relation to Tp and Ne. Thus, T0 is set equal to T01map, and T1 is set equal to T1map, at the step S7.

When Tp≦Tp0, the controller 10 proceeds from the step S6 to a step S8. At the step S8, the controller 10 sets the time duration T0 for the combustion mode for producing CO only by compression stroke injection. The time duration T1 for the dual injection combustion mode is set equal to zero since the dual injection combustion mode is not performed. In this example, T0 is determined in accordance with the engine load Tp and the engine speed by lookup from a map as in the step S7. The map for determining T0 in the step S8 is different from the map used for determining T0 in the step S7.

At a step S9 reached after the step S7 or S8 or after the step S4 in the case of the negative answer of S4, the controller 10 determines whether the elapsed time T from the fulfillment of the catalyst regeneration condition is equal to or smaller than the time duration T0.

When T≦T0, the controller 10 takes a control flow of steps S11~S13 to set the fuel injection quantity and the fuel injection timing for compression stroke injection to release NOx.

First, the controller 10 increments the time T of the timer by the cycle time t of this routine at a step S10. That is, T=Tz+t where Tz is the value of the timer just before the execution of this step.

Then, at the step S11 following the step S10, the controller 10 sets an intake stroke injection quantity TiH equal to zero.

At the step S12, the controller 10 calculates a compression stroke fuel injection quantity TiS (a first fuel injection quantity) by using a target equivalent ratio TFBYA0 during a catalyst regeneration control. That is, TiS=Tp×TFBYA0. This target equivalent ratio TFBYA0 is equal to or smaller than one. In this example, TFBYA0 is smaller than one. When, for example, the release of NOx is performed at an average air fuel ratio of 18, then TFBYA0 is set approximately equal to 0.8.

Figure 4:
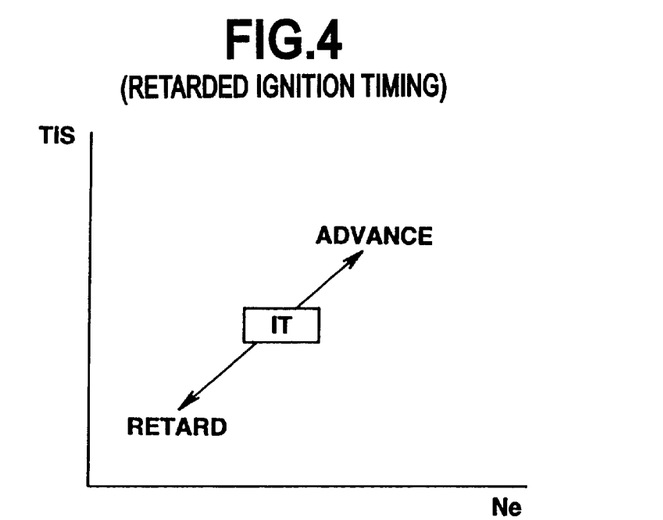
FIGS. 4, 5 and 6 are graphs showing compression stroke fuel injection timing maps used in the control system of FIG. 1.

At the step S13, the controller 10 determines a compression stroke fuel injection timing ITS in accordance with the compression stroke fuel injection quantity TiS and the engine speed Ne. In this example, the controller 10 determines a map value IT1 by lookup from a fuel injection timing map in accordance with TiS and Ne, as shown in FIG. 4, and sets the compression stroke fuel injection timing ITS (a first fuel injection timing) at IT1 (ITS=IT1).

Fuel injected on the compression stroke diffuses with the passage of time. As the diffused region expands with time, the air fuel ratio in the diffused region becomes greater. Provided that the fuel injection quantity is constant, the air fuel ratio of the air fuel mixture in the vicinity of the spark plug at the time point of ignition is decreased as the fuel injection timing is shifted (or retarded) toward the top dead center on the compression stroke. If the fuel injection timing is held constant, the air fuel ratio of the air fuel mixture in the vicinity of the spark plug at the time point of ignition is decreased as the fuel injection quantity is increased. Moreover, the injection timing is determined in terms of the angular position of the crank shaft. Therefore, even if the injection timing remains unchanged, as the engine speed increases, the time from injection to ignition becomes shorter, and the air fuel ratio of the air fuel mixture in the vicinity of the spark plug at the time point of ignition is decreased. The fuel injection timing map shown in FIG. 4 stores values of the compression stroke fuel injection timing to make the air fuel ratio of the air fuel mixture in the vicinity of the spark plug at the time point of ignition richer than the stoichiometric ratio (at a richer ratio of about 12, for example) as a function of the fuel injection quantity TiS and the engine speed Ne.

The fuel injection timing ITS can be determined as a crank angle at which fuel injection is to be started, or a crank angle at which fuel injection is to be finished. To accurately control the time from the end of fuel injection to ignition, it is preferable to employ, as the fuel injection timing, the crank angle at which the fuel injection should end.

When the answer of the step S9 is negative, the controller 10 proceeds from the step S9 to a step 514. At the step S14, the controller 10 determines whether the elapsed time T from the fulfillment of the catalyst regeneration condition is equal to or smaller than T0+T1.

When T>T0 and T≦T0+T1, the controller 10 takes a control flow of steps S16~S18 to set fuel injection quantities and fuel injection timings for the duel fuel injection to release NOx.

When T1 is set equal to zero at the step S8 in the case of Tp being smaller than or equal to Tp0, the answer of the step S14 is always negative as long as the answer of the step S9 is negative (T>T0). As a result, the control mode is shifted to the normal control without performing the catalyst regeneration control by the dual injection.

In the case of the control flow of the steps S16~S18, the controller 10 first increments the elapsed time T by the cycle time t at a step S15 (in the same manner as in the step S10).

At the step S16 following the step S15, the controller 10 determines an intake stroke fuel injection quantity TiH (a fourth fuel injection quantity) by using an equivalent ratio TFBYA1. In this example, TiH=Tp×TFBYA1. The equivalent ratio TFBYA1 is set equal to a value richer than an equivalent ratio value enabling flame propagation and leaner than the target equivalent ratio TFBYA0 for the catalyst regeneration control; In this example, TFBYA1 is in a range of 0.65~0.75 (corresponding to an air fuel ratio range of 22~19).

At the step S17, the controller 10 calculates a compression stroke fuel injection quantity TiS (a fifth fuel injection quantity) from the target equivalent ratio TFBYA0 for the catalyst regeneration control and the intake stroke fuel injection quantity TiH calculated at the step S16. In this example, the compression stroke fuel injection quantity TiS is determined by subtracting TiH from Tp×TFBYA0. That is, TiS=Tp×TFBYA0−TiH.

In this example, the target equivalent ratio TFBYA0 for the catalyst regeneration control is fixed at a predetermined single constant value. It is, however, optional to set TFBYA0 equal to a first value in the case of single compression stroke injection (at the step S12) and to a second value different from the first value in the case of dual injection (at the step S17).

At the step S18, the controller 10 sets an intake stroke fuel injection timing ITH (a fourth fuel injection timing) and a compression stroke fuel injection timing ITS (a fifth fuel injection timing).

In this example, the intake stroke fuel injection timing ITH is set at a map value IT4 determined by lookup from a fuel injection timing map (not shown) in accordance with the intake stroke fuel injection quantity TiH and the engine speed Ne. That is, ITH=IT4. This fuel injection timing map stores a collection of such desired values of the fuel injection timing ITH on the intake stroke as to promote the mixing between the intake air and the injected fuel sufficiently. The fuel injection timing ITH may be a timing of an end of a fuel injection or a timing of a start of a fuel injection in terms of the crank angle.

Figure 5:
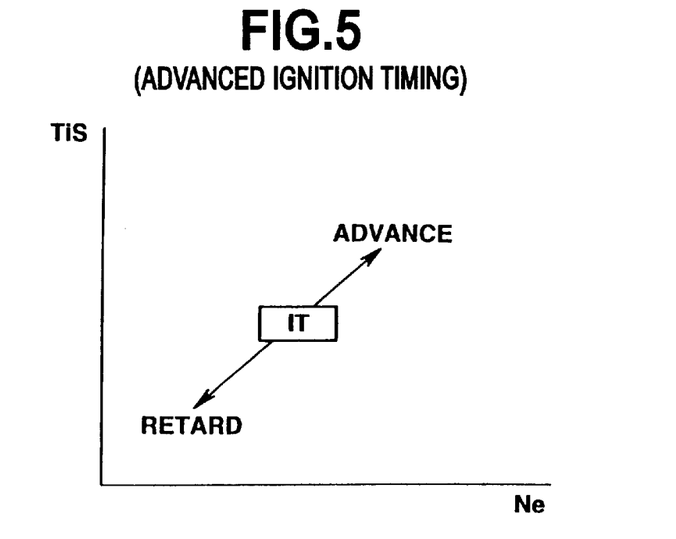

The compression stroke fuel injection timing ITS is set at a map value IT5 determined in accordance with the compression stroke fuel injection quantity TiS and the engine speed Ne by lookup from a fuel injection timing map (as shown in FIG. 5).

In the dual injection, a rich air fuel mixture region richer than the stoichiometric ratio is produced closely around the spark plug not by the compression stroke fuel injection alone, but by the combination of the intake stroke injection and the compression stroke injection. In the compression stroke injection, fuel is injected into a background already produced over the combustion chamber by the fuel injection on the intake stroke.

For example, the intake stroke fuel injection is performed so as to produce a background region having an air fuel ratio of 22 over the combustion chamber, and then the compression stroke fuel injection is performed so as to produce an air fuel mixture region having an air fuel ratio of 26 around the spark plug. In this case, the air fuel ratio in the rich region formed by the fuel injected by the intake stroke injection and the fuel injected by the compression stroke injection is about 12.

A step S19 is reached when T>T0+T1 and hence the answer of the step S14 is negative. At the step S19, the controller 10 examines whether the target equivalent ratio TFBYA determined at the step S3 is smaller than one. Then, the controller 10 takes a control flow of steps S20~S22 to set fuel injection quantity and timing for the normal lean operation when TFBYA>1, and a control flow of steps S23~S25 to set fuel injection quantity and timing for the normal stoichiometric operation when TFBYA≧1.

At the step S20, the intake stroke fuel injection quantity TiH is set equal to zero (TiH=0).

At the step S21, the controller 10 calculates the compression stroke fuel injection quantity TiS (a second fuel injection quantity) by using the target equivalent ratio TFBYA determined at the step S3. In this example, TiS=Tp×TFBYA.

Figure 6:
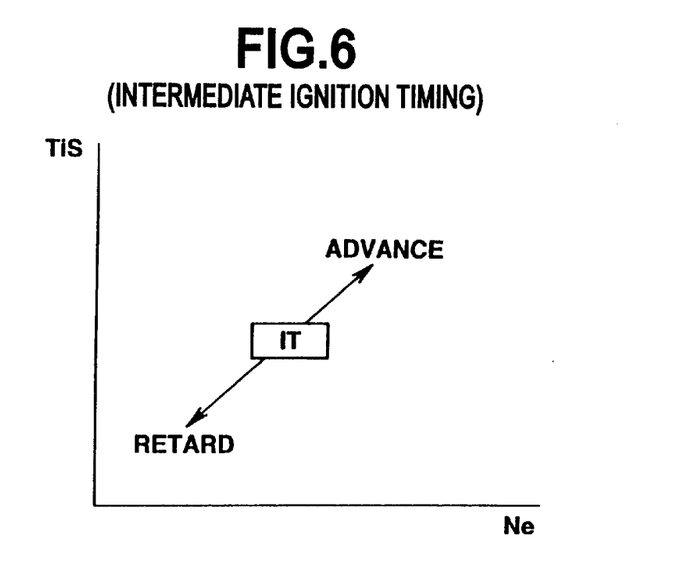

At the step S22, the controller 10 sets the compression stroke fuel injection timing ITS (a second fuel injection timing) at a map value IT2 determined in accordance with the compression stroke fuel injection quantity TiS and the engine speed Ne by lookup from a fuel injection timing map (as shown in FIG. 6).

The fuel injection timing map shown in FIG. 6 stores a collection of such desired values of the fuel injection timing on the compression stroke, as a function of the fuel injection quantity TiS and the engine speed Ne, as to produce an approximately stoichiometric air fuel mixture region closely around the spark plug at the time point of ignition.

The compression stroke fuel injection timing maps shown in FIGS. 4, 5 and 6 are different from one another. Among map values of FIGS. 4, 5 and 6 for the same fuel injection quantity and the same engine speed, the map value of FIG. 4 (used in the step S13) is a most retarded value closest to the top dead center on the compression stroke, the map value of FIG. 5 (used in the step S18) is a most advanced value furthest from the top dead center on the compression stroke, and the map value of FIG. 6 (used in the step S22) is an intermediate value between the most retarded value and the most advanced value.

At the step S23, the controller 10 calculates the intake stroke fuel injection quantity TiH (a third fuel injection quantity) by using the target equivalent ratio TFBYA determined at the step S3. In this example, TiH=Tp×TFBYA At the step S24, the controller 10 sets the compression stroke fuel injection quantity TiS equal to zero.

At the step S25, the controller 10 sets the intake stroke fuel injection timing ITH (a third fuel injection timing) at a map value IT3 (ITH=IT3) determined in accordance with the intake stroke fuel injection quantity TiH and the engine speed Ne by lookup from an intake stroke fuel injection timing map (not shown). This map may be the same map used in the step S18 to determine IT4.

FIGS. 7–10 illustrate the catalyst regeneration control in this embodiment.

Figure 7:
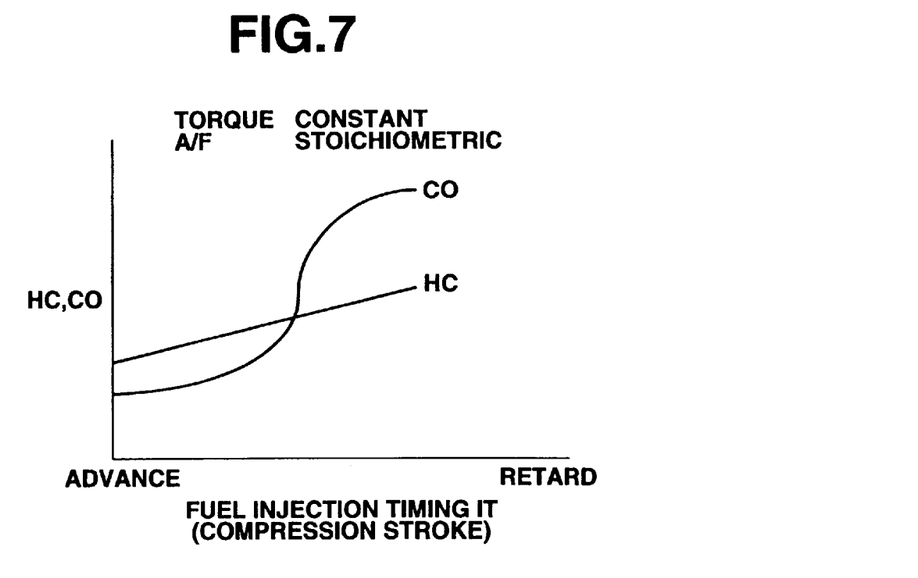
FIG. 7 is a graph showing a relation between exhaust performance and compression stroke fuel injection timing.

As shown in FIG. 7, the HC and CO exhaust quantities in the case of stratified charge combustion by compression stroke fuel injection vary in accordance with the fuel injection timing. Even when the average air fuel ratio is stoichiometric, as the fuel injection timing is retarded, the air fuel ratio in the vicinity of the spark plug 6 becomes richer and hence the HC and CO exhaust quantities increase.

Figure 8:
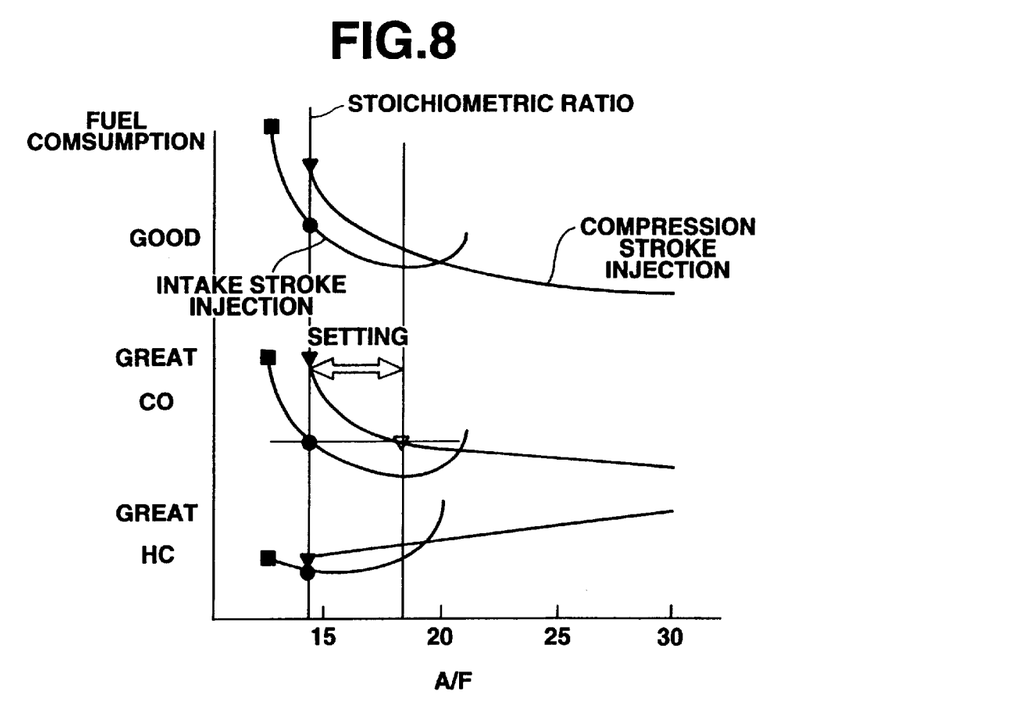
FIG. 8 is a graph showing fuel consumption and exhaust performance as a function of the air fuel ratio in compression stroke fuel injection and intake stroke fuel injection.

FIG. 8 shows the fuel consumption and exhaust characteristics varying in dependence on the air fuel ratio in each of operation with the compression stroke fuel injection and operation with the intake stroke fuel injection. Comparison at the stoichiometric air fuel ratio reveals that the compression stroke fuel injection is inferior in fuel consumption to the intake stroke fuel injection, but the HC and CO exhaust quantities are relatively large in the case of the compression stroke fuel injection. The same tendency exists about an air fuel ratio A/F of 18, slightly leaner than the stoichiometric ratio. In the region in which the air fuel ratio is greater than 20, the characteristics of the fuel consumption, HC and CO are inverted.

Therefore, in order to achieve the same HC and CO exhaust quantities by the intake stroke injection instead of the compression stroke injection, it is necessary to further make the air fuel ratio richer. The fuel consumption is poorer in the case of the intake stroke fuel injection for the same HC and CO quantities.

The control system according to the present invention utilizes such a phenomenon and ensures the required HC and CO quantities by the compression stroke fuel injection without shifting the air fuel ratio to the rich side.

Thus, by setting the air fuel ratio during the catalyst regeneration control at a ratio equal to or slightly leaner than the stoichiometric ratio, the control system can achieve the NOx desorbing and reducing operations without deteriorating the fuel economy. In this example, the air fuel ratio for the catalyst regeneration control is set in a range from about the stoichiometric ratio to about A/F=18 at which the CO exhaust quantity is substantially equal to that obtained by the intake stroke fuel injection at the stoichiometric ratio. The operation on the leaner side of the stoichiometric restrains an unwanted torque increase, and eliminates the need for ignition timing retard control to prevent torque change.

The desired air fuel ratio for the NOx desorbing control varies in dependence on the configuration of the piston crown or the characteristic of the fuel injector.

Figure 9:
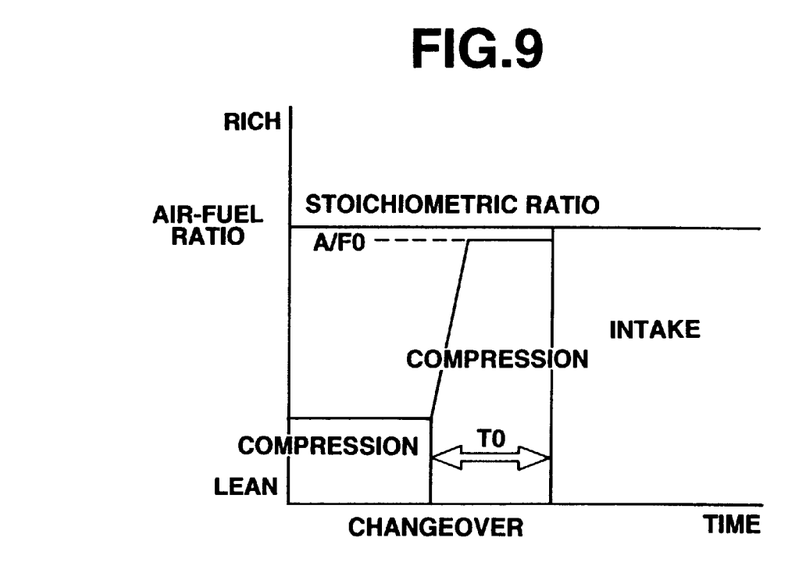
FIGS. 9 and 10 are graphs for illustrating fuel injection changeover patterns in the engine system of FIGS. 1 and 2.

FIG. 9 illustrates a combustion changeover when the engine load is not so high. When a changeover from the lean air fuel operation to the stoichiometric air fuel ratio operation is requested in accordance with the engine operating condition (such as the engine load and the engine speed), the average air fuel ratio (or the target overall air fuel ratio) is changed from an ultra level of the normal stratified charge combustion mode, to a non-rich air fuel ratio level slightly leaner than or equal to the stoichiometric ratio, and the compression stroke fuel injection is performed at that air fuel ratio to ensure sufficient amounts of HC and CO to release NOx absorbed in the catalyst 8.

Figure 10:
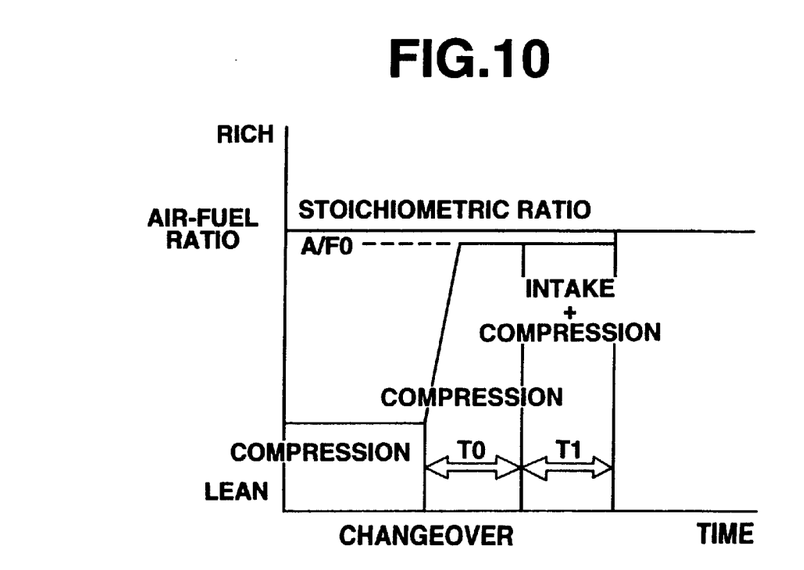

FIG. 10 illustrates a combustion changeover when the engine load is relatively high. In response to a request of changeover from a lean air fuel ratio to a stoichiometric air fuel ratio produced in accordance with variation in the engine operating condition, the control system first operates the engine in the temporary compression stroke fuel injection mode at an air fuel ratio level which is richer than the level of the normal stratified charge combustion mode and which is equal to or slightly leaner than the stoichiometric ratio. Thereafter, the control system operates the engine in the temporary dual injection mode with an intake stroke fuel injection and a compression stroke fuel injection in each cycle. With the temporary compression stroke injection mode (during the period of T0) and the temporary dual injection mode (during the period of T1), the control system promotes the desorption and reduction of NOx.

With the duel injection mode following the temporary compression stroke injection mode, the control system can control the torque generated by the engine stepwise in the combustion changeover process to the normal intake stroke injection mode, and thereby prevent torque shock in transition to the stoichiometric air fuel ratio operation.

After the completion of desorption of NOx from the catalyst 8 and reduction of NOx, the engine is operated in the stoichiometric ratio combustion mode with the intake stroke fuel injection.

In this embodiment, the NOx desorbing and reducing control is performed in each changeover from the lean air fuel ratio operation to the stoichiometric ratio operation. The present invention is not limited to this, however. It is optional to estimate the NOx absorption quantity from the operation time of the lean air fuel ratio operation, and the engine load and the engine speed during the lean air fuel ratio operation, and to start the NOx desorption control when the NOx absorption quantity in the catalyst 8 becomes equal to or greater than a predetermined level near a saturation level because of persistence of the lean operation.

If, in this case, the engine operating point is in the lean air fuel ratio operating region at the completion of the catalyst regeneration control, the normal stratified charge combustion is resumed at A/F=40, for example.

It is further optional to perform the catalyst regeneration control at each transition from the lean air fuel ratio to the stoichiometric ratio, and to further perform the catalyst regeneration control immediately when the NOx absorption quantity becomes equal to or greater than the predetermined quantity.

The entire contents of a Japanese Patent Application No. 10-283932 with a filing date of Oct. 6, 1998 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An exhaust gas purification device for an engine, comprising:
   a catalyst disposed in an exhaust passage of the engine, the catalyst trapping and storing NOx when an exhaust gas mixture flowing into the catalyst has a low reductant content, and the catalyst reducing NOx stored in the catalyst when the exhaust gas mixture has a high reductant content;
   an injector injecting fuel directly into a combustion chamber of the engine;
   a spark plug igniting the fuel in the combustion chamber; and
   a controller programmed:
      to detect an catalyst regeneration condition for regenerating the catalyst by reducing NOx stored in the catalyst;

to calculate a first fuel injection quantity from fulfillment of the catalyst regeneration condition to the expiration of a first time period, the first fuel injection quantity being equal to or smaller than a stoichiometric fuel quantity required to set an average air fuel ratio in the combustion chamber equal to a stoichiometric air fuel ratio;

to calculate a first fuel injection timing based on the first fuel injection quantity, the first fuel injection timing being such a fuel injection timing on a compression stroke as to produce an air fuel mixture having a rich air fuel ratio in a limited region around the spark plug; and to control the injector according to the first fuel injection quantity and the first fuel injection timing from the fulfillment of the catalyst regeneration condition to the expiration of the first time period.

2. An exhaust gas purification device according to claim 1 wherein the controller is further programmed to monitor an engine operating condition to detect transition of the engine operating condition from a lean air fuel ratio operating region to a stoichiometric air fuel ratio operating region, and to detect the catalyst regeneration condition when the transition from the lean air fuel ratio operating region to the stoichiometric air fuel ratio operating region is detected.

3. An exhaust gas purification device according to claim 2 wherein the controller is further programmed:

to calculate a second fuel injection quantity when the engine operating condition is in the lean air fuel ratio operating region, the second fuel injection quantity being a fuel injection quantity to set the average air fuel ratio in the combustion chamber equal to a lean air fuel ratio;

to calculate a third fuel injection quantity when the engine operating condition is in the stoichiometric ratio operating region and the first time period is not in progress, the third fuel injection quantity being a fuel injection quantity to set the average air fuel ratio in the combustion chamber approximately equal to the stoichiometric air fuel ratio;

to calculate a second fuel injection timing based on the second fuel injection quantity, the second fuel injection timing being such a fuel injection timing on the compression stroke as to produce an air fuel mixture having an approximately stoichiometric air fuel ratio in a limited region around the spark plug, to calculate a third fuel injection timing based on the third fuel injection quantity, the third fuel injection timing being on an intake stroke of the engine;

to control the injector according to the second fuel injection quantity and the second fuel injection timing when the engine operating condition is in the lean air fuel ratio operating region; and to control the injector according to the third fuel injection quantity and the third fuel injection timing when the engine operating condition is in the stoichiometric air fuel ratio operating region and the first time period is not in progress.

4. An exhaust gas purification device according to claim 3 wherein the controller is further programmed:

to calculate fourth and fifth fuel injection quantities from expiration of the first time period to expiration of a second time period, a sum of the fourth and fifth fuel injection quantities being equal to or smaller than the stoichiometric fuel quantity required to set the average air fuel ratio in the combustion chamber equal to the stoichiometric air fuel ratio;

to calculate a fourth fuel injection timing based on the fourth fuel injection quantity, the fourth fuel injection timing being on the intake stroke;

to calculate a fifth fuel injection timing based on the fifth fuel injection quantity, the fifth fuel injection timing being on the compression stroke; and to control the injector according to the fourth fuel injecting quantity and timing and the fifth fuel injecting quantity and timing from the expiration of the first period after the fulfillment of the release condition to the end of the second time period.

5. An exhaust gas purification device according to claim 1 wherein the first fuel injection quantity is greater than or equal to a predetermined lower limit fuel quantity setting the average air fuel ratio in the combustion chamber at a lean air fuel ratio at which a CO exhaust quantity produced by a compression stroke injection is approximately equal to a CO exhaust quantity produced by an intake stroke injection at the stoichiometric air fuel ratio.

6. An exhaust gas purification device according to claim 1 wherein the exhaust gas purification device further comprises first and second engine operating condition sensors for collecting information on engine speed and engine load of the engine, and wherein the controller is programmed to detect the catalyst regeneration condition by monitoring the engine speed and the engine load.

7. An exhaust gas purification device according to claim 1 wherein the exhaust gas purification device further comprises first and second engine operating condition sensors for collecting information on engine speed and engine load of the engine, and wherein the controller is programmed to set a period of a catalyst regeneration control in accordance with the engine speed and the engine load.

8. An engine system comprising:

a direct injection internal combustion engine;

a catalyst disposed in an exhaust passage of the engine, for trapping and reducing NOx in dependence on a reductant content in an inflowing exhaust gas mixture flowing into the catalyst;

a sensor for sensing an engine operating condition of the engine; and a controller for controlling a fuel injection quantity and a fuel injection timing of the engine in a stratified charge combustion mode in a predetermined engine operating region, for monitoring the engine operating condition to detect a predetermined catalyst regeneration condition for starting a catalyst regeneration combustion mode to regenerate the catalyst, and for changing an engine control mode, upon detection of the catalyst regeneration condition, from the stratified charge combustion mode to the catalyst regeneration combustion mode by increasing the fuel injection quantity from an ultra lean level to achieve an ultra lean target air fuel ratio for the stratified charge combustion mode to a non-rich level to achieve a non-rich target air fuel ratio equal to or leaner than a stoichiometric air fuel ratio, and by holding the fuel injection timing on a compression stroke.

9. An engine system according to claim 8 wherein the controller is configured to set the fuel injection timing and the fuel injection quantity in the catalyst regeneration combustion mode so as to produce a rich air fuel mixture region richer than the stoichiometric air fuel ratio in the vicinity of a spark plug of the engine at a time of ignition.

10. An engine system according to claim 8 wherein the controller is configured to set the fuel injection quantity in the catalyst regeneration combustion mode at the non-rich level to achieve the non-rich target air fuel ratio which is equal to or richer than about 18.

11. An engine system according to claim 8 wherein the catalyst regeneration combustion mode comprises a catalyst regeneration compression stroke injection mode for injecting fuel at a compression stroke fuel injection timing on the compression stroke in a compression stroke fuel injection quantity to achieve the non-rich target air fuel ratio equal to or leaner than the stoichiometric ratio and to produce a rich air fuel region richer than the stoichiometric ratio in the vicinity of the spark plug, and a catalyst regeneration dual injection mode for producing a rich air fuel region in the vicinity of the spark plug by a complementary compression stroke fuel injection in a homogenous background prepared by a preliminary intake stroke fuel injection, and where the controller is configured to respond to detection of the catalyst regeneration condition by controlling the engine first in the catalyst regeneration compression stroke injection mode, and then in the catalyst regeneration dual injection mode.

12. An engine system according to claim 8 wherein the controller is configured to determine the fuel injection quantity in accordance with a first quantity representing a base fuel injection quantity determined in accordance with the engine operating condition and a second quantity determined by a target overall air fuel ratio, and to set the target overall air fuel ratio equal to the ultra lean air fuel ratio in the stratified charge combustion mode, and to the non-rich target air fuel ratio in the catalyst regeneration combustion mode.

13. An engine controlling device for regenerating a catalyst disposed in an exhaust passage of an engine, the engine controlling device comprising:

means for calculating a first fuel injection quantity for a catalyst regeneration control, the first fuel injection quantity being equal to or smaller than a stoichiometric fuel quantity required to set an average air fuel ratio in the combustion chamber equal to a stoichiometric air fuel ratio;

means for calculating a first fuel injection timing based on the first fuel injection quantity for the catalyst regeneration control, the first fuel injection timing being such a timing on a compression stroke as to produce an air fuel mixture having a rich air fuel ratio in a limited region around the spark plug by fuel injection in the first injection quantity; and means for controlling the engine according to the first fuel injection quantity and the first fuel injection timing from detection of a predetermined catalyst regeneration condition to expiration of a predetermined time period.

14. An engine controlling process for regenerating a catalyst disposed in an exhaust passage of an engine, the engine controlling process comprising:

detecting a predetermined catalyst regeneration condition for starting an catalyst regeneration control to regenerate the catalyst by reducing NOx stored in the catalyst;

calculating a first fuel injection quantity for the catalyst regeneration control, the first fuel injection quantity being equal to or smaller than a stoichiometric fuel quantity required to set an average air fuel ratio in the combustion chamber equal to a stoichiometric air fuel ratio;

calculating a first fuel injection timing based on the first fuel injection quantity for the catalyst regeneration control, the first fuel injection timing being such a fuel injection timing on a compression stroke as to produce an air fuel mixture having a rich air fuel ratio in a limited region around the spark plug; and controlling the engine according to the first fuel injection quantity and the first fuel injection timing from detection of the predetermined NOx condition to the expiration of a predetermined time period.

* * * * *